US011425862B2

(12) United States Patent
Ricketts (10) Patent No.: US 11,425,862 B2
(45) Date of Patent: *Aug. 30, 2022

(54) ADJUSTABLE FAN BASED ON GRAIN THROUGHPUT

(71) Applicant: CNH Industrial America LLC, New Holland, PA (US)

(72) Inventor: Jonathan E. Ricketts, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 371 days.

This patent is subject to a terminal disclaimer.

(21) Appl. No.: 16/641,094

(22) PCT Filed: Aug. 22, 2018

(86) PCT No.: PCT/US2018/047560
§ 371 (c)(1),
(2) Date: Feb. 21, 2020

(87) PCT Pub. No.: WO2019/040642
PCT Pub. Date: Feb. 28, 2019

(65) Prior Publication Data
US 2020/0187422 A1    Jun. 18, 2020

Related U.S. Application Data

(63) Continuation of application No. 15/682,779, filed on Aug. 22, 2017, now Pat. No. 10,448,576.

(51) Int. Cl.
*A01F 12/44* (2006.01)
*A01D 41/127* (2006.01)

(52) U.S. Cl.
CPC ........ *A01F 12/444* (2013.01); *A01D 41/1271* (2013.01)

(58) Field of Classification Search
CPC ............ A01D 41/1271; A01D 41/1276; A01D 75/282; A01F 12/444
See application file for complete search history.

(56) References Cited

U.S. PATENT DOCUMENTS 4,466,230 A    8/1984   Osselaere et al.
5,775,072 A *  7/1998   Herlitzius .......... A01D 41/1276
                                                      460/7

(Continued)

FOREIGN PATENT DOCUMENTS

EP    1862056 A1   12/2007
EP    2022312 A2    2/2009
GB    2098446 A    11/1982

OTHER PUBLICATIONS

International Search Report and Written Opinion for PCT Application No. PCT/US2018/047560 dated Nov. 26, 2018 (13 pages).

*Primary Examiner* — Adam J Behrens
*Assistant Examiner* — Matthew Ian Neal
(74) *Attorney, Agent, or Firm* — Peter Zacharias; Patrick Sheldrake (57) ABSTRACT

A combine (10) including a cutting wheel for harvesting crop, a separating system (24) for threshing the harvested crop to separate grain from residue, at least one of a yield monitor (115) or a loss monitor (113), a crop cleaning system (26) including a cleaning fan (52), and a controller (310) coupled to the at least one of the yield monitor (115) or the loss monitor (113). The controller (310) controls the crop cleaning system (26), and is configured to determine at least one of a throughput from the yield monitor (115), or a loss from the loss monitor (113), compare the determined throughput or loss to a respective throughput threshold or loss threshold, and control a speed of the cleaning fan (52) based on the throughput or loss comparison.

14 Claims, 9 Drawing Sheets

(56) References Cited

U.S. PATENT DOCUMENTS

| | | | |
|---|---|---|---|
| 6,119,442 A | 9/2000 | Hale | |
| 6,591,145 B1 | 7/2003 | Hoskinson et al. | |
| 7,403,846 B2 * | 7/2008 | Maertens | A01F 12/446 |
| | | | 701/50 |
| 7,630,808 B2 * | 12/2009 | Behnke | A01D 41/127 |
| | | | 701/50 |
| 7,645,190 B2 | 1/2010 | Schwinn et al. | |
| 7,670,218 B2 * | 3/2010 | Behnke | A01D 41/1276 |
| | | | 460/4 |
| 8,115,923 B2 | 2/2012 | Priesnitz et al. | |
| 8,469,784 B1 | 6/2013 | Hoskinson et al. | |
| 8,626,400 B2 | 1/2014 | Sheidler et al. | |
| 9,125,344 B2 | 9/2015 | Baumgarten et al. | |
| 9,125,346 B2 * | 9/2015 | Schulz | A01D 75/282 |
| 9,560,802 B1 | 2/2017 | Palla et al. | |
| 9,706,709 B2 * | 7/2017 | Cracraft | A01D 46/085 |
| 9,723,784 B2 | 8/2017 | Bremer et al. | |
| 10,091,934 B2 | 10/2018 | Dugas et al. | |
| 10,897,848 B2 * | 1/2021 | Wold | A01F 12/446 |
| 2016/0330906 A1 | 11/2016 | Acheson et al. | |
| 2019/0146426 A1 * | 5/2019 | Blank | A01D 41/127 |
| | | | 701/50 |
| 2020/0015417 A1 * | 1/2020 | Linde | A01D 41/1276 |

* cited by examiner

| TROUGHPUT THRESHOLD | FAN RPM |
|---|---|
| T1 | RPM1 |
| T2 | RPM2 |
| T3 | RPM3 |
| T4 | RPM4 |

| LOSS THRESHOLD | FAN RPM |
|---|---|
| L1 | RPM1 |
| L2 | RPM2 |
| L3 | RPM3 |
| L4 | RPM4 |

| THROUGHPUT/LOSS THRESHOLD | FAN RPM |
|---|---|
| Throughput>T1 & Loss>L1 | RPM1 |
| Throughput<T1 & Loss<L1 | RPM2 |
| Throughput>T1 & Loss<L1 | RPM3 |
| Throughput<T1 & Loss>L1 | RPM4 |

ADJUSTABLE FAN BASED ON GRAIN THROUGHPUT

FIELD

The invention relates to a combine that automatically controls a speed of a fan in the cleaning system based on grain throughput.

BACKGROUND

Harvesters (e.g. combines) are used to harvest crops. Operations performed by these combines include threshing and separating grain from crop residue. Ideally, only grain falls through perforated pans into a cleaning system to be collected. However, unwanted residue also falls through the pans and into the cleaning system. A fan is employed in the cleaning system in order to remove this residue. The goal is to blow the residue out of the cleaning system while retaining the grain. Conventional combines, however, have no means of automatically adjusting the fan speed during harvesting. Rather, the fan speed is set at a constant level during harvesting. When throughput is high, the fan speed may be too low to properly blow the residue out of the cleaning system, resulting in an unacceptable amount of residue being collected with the grain. When throughput is low, the fan speed may be too high resulting in the grain being blown off of the cleaning system, thereby increasing loss.

SUMMARY

An embodiment includes a combine having a header for harvesting crop, a separating system for threshing the harvested crop to separate grain from residue, at least one of a yield monitor or a loss monitor, a crop cleaning system including a cleaning fan, and a controller coupled to the at least one of the yield monitor or the loss monitor. The controller controls the crop cleaning system, and is configured to determine at least one of a throughput from the yield monitor, or a loss from the loss monitor, compare the determined throughput or loss to a respective throughput threshold or loss threshold, and control a speed of the cleaning fan based on the throughput or loss comparison.

Another embodiment includes method for controlling a combine including controlling a cutting wheel of the combine to harvest crop, controlling a separating system of the combine to thresh the harvested crop and separate grain from residue, controlling a crop cleaning system that includes a cleaning fan, and controlling the crop cleaning system. The crop cleaning system is controlled by determining at least one of throughput from the yield monitor or loss from the loss monitor, comparing the determined throughput or loss to a respective throughput threshold or loss threshold, and controlling a speed of the cleaning fan based on the throughput or loss comparison.

DETAILED DESCRIPTION

Aspects of the invention provide methods and systems for operating a combine to automatically control cleaning fan speed based on grain throughput and/or grain loss. The system determines grain throughput and/or grain loss and automatically controls the fan speed to reduce grain loss while also reducing processing load on the cleaning system.

The terms "grain," "straw," and "tailings" are used principally throughout the specification for convenience but it is to be understood that these terms are not intended to be limiting. Thus "grain" refers to that part of the crop material which is threshed and separated from the discardable part of the crop material, which is referred to as non-grain crop material, material other than grapes (MOG) or straw. Incompletely threshed crop material is referred to as "tailings." Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1A:
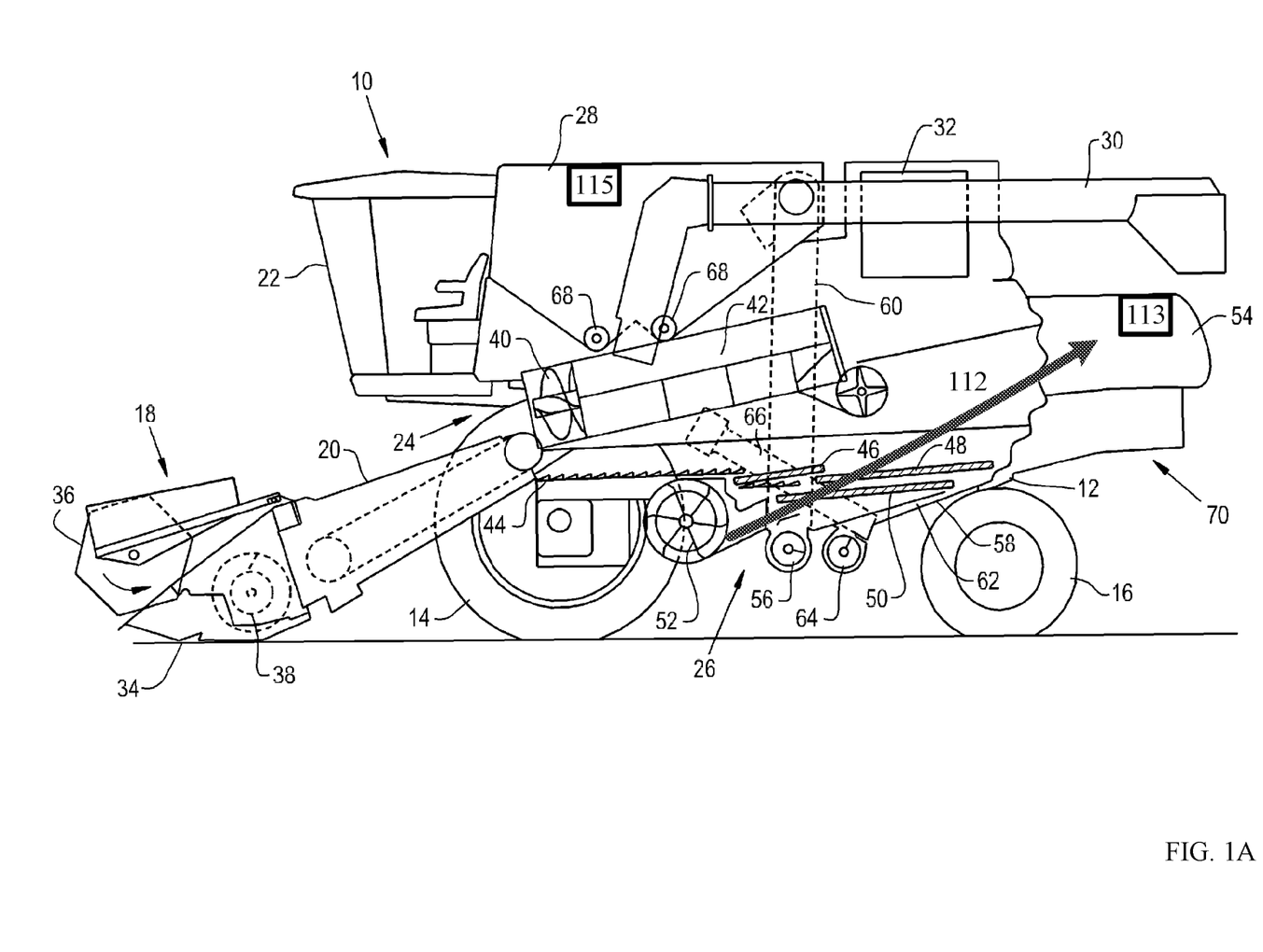
FIG. 1A is a side view of a combine, according to an embodiment of the invention.

Referring now to the drawings, and more particularly to FIG. 1A, there is shown an embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. Header 18 may be removable from the combine such that headers designed for particular crops are interchangeable. In one example, a rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow 112 through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, counter knives, a swath selection door and a residue spreader. When combine 10 operating in the chopping and spreading mode, the chopper is set to a relatively high speed (e.g. 3,000 RPM), the counter knives may be engaged, the swath selection door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the swath selection door is open. The residue spreader may continue operation to spread only the chaff, with the crop material passing through the passageway created by the open swath selection door.

Figure 1B:
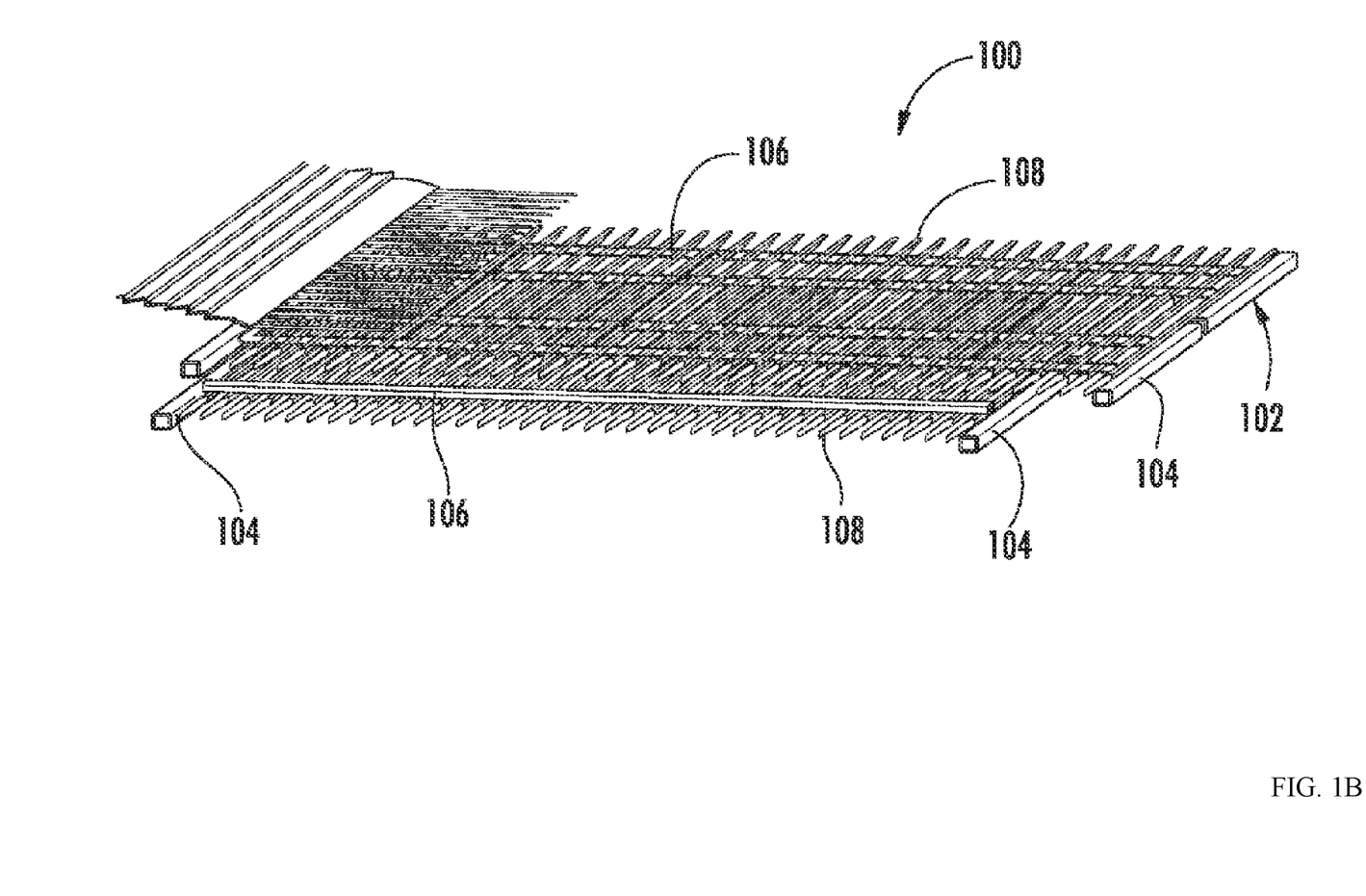
FIG. 1B is a perspective view of a sieve assembly for use in the combine cleaning system, according to an embodiment of the invention.

FIG. 1B shows an example of a sieve assembly 100 which may be used for one or more of the pre-cleaning sieve 46, upper sieve 48 and lower sieve 50 of cleaning system 26. Sieve assembly 100 generally includes a frame structure 102 typically comprised of longitudinal members 106 and transverse members 104 that define a grid-type configuration. Sieve elements 108 are supported by the frame structure 102. The invention is not limited by any particular type of sieve element 108 or frame structure 102. Typical sieve elements 102 may be louver elements, as is generally well-known in the art and need not be described in detail herein.

Figure 2:
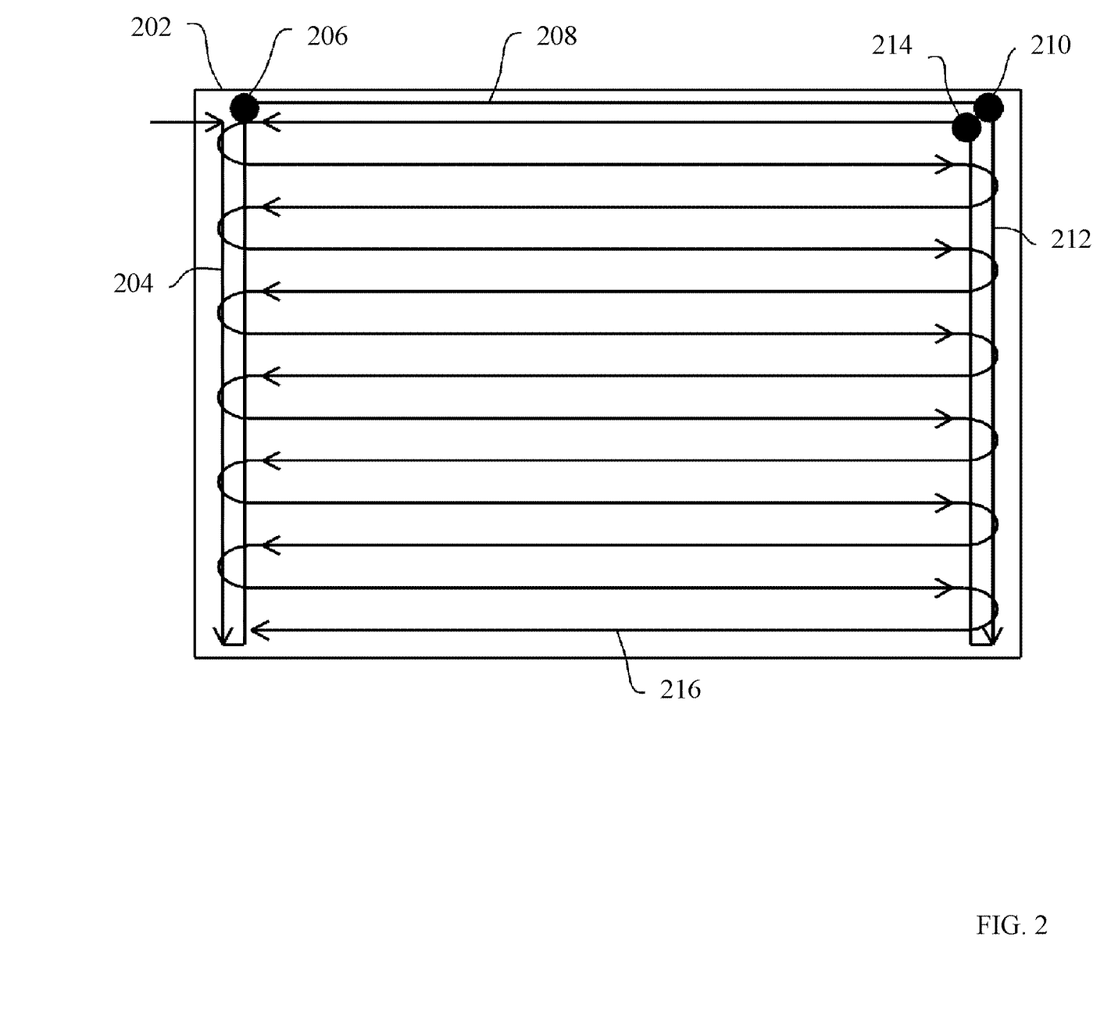
FIG. 2 is a top view of a harvesting path traversed by the combine, according to an embodiment of the invention.

The pathways shown in FIG. 2 are typical for a plot of land 202 that is to be harvested. Typically, as harvesting is performed, the combine may employ residue system 70 to perform spreading and/or windrowing of the harvested crops at different locations of the field. For example, the combine may start performing spreading along path 204. Once the combine reaches point 208, a turn is made and spreading is performed along path 206. Once the combine reaches point 210, a turn is made and spreading is performed along path 212. Finally, once the combine reaches point 214, a turn is made and windrowing is performed in a zig-zag pattern along path 216.

Regardless of the operational mode, the combine monitors both yield and loss of the grain to ensure efficient operation. Loss is generally defined as a percentage of grain lost to total grain harvested. Loss includes grain that is accidentally blown by cleaning fan 52 into the straw hood 54 and ejected from the combine rather than collected in the tank. In contrast, yield is generally defined as the amount of grain collected in the tank (e.g. bushels).

Loss may be monitored by a loss sensor 113 positioned within straw hood 54 (see FIG. 1). Loss sensor 113 may be an acoustic sensor that detects certain audible frequencies that are associated with grain hitting the metal frame of straw hood 54. For example, grain (e.g. seeds) may make a distinctive sound as compared to the chaff when they hit the metal frame of straw hood 54. This signal can be sent to a controller (not shown) that counts the number of hits to compute the amount of grain that is lost during operation.

Yield may be monitored by a yield sensor 115 that could be positioned within grain tank 28 (see FIG. 1). Yield sensor 115 may be an acoustic sensor, radar sensor or the like that measures distance. Generally, yield sensor 115 transmits a signal towards the bottom of grain tank 28 and receives a reflection signal from the grain. A controller uses the roundtrip travel time of the signal and the speed of the signal to compute the distance from the sensor to the pile of grain. The controller uses this distance to determine how much grain is in grain tank 28 at any given time. As the grain pile grows, the roundtrip travel time of the signal decreases indicating that the grain pile is getting closer to the top of grain tank 28.

Throughput is yet another metric that can be determined based on yield. As described above, yield is determined based on signals transmitted and received by yield sensor 115. Throughput is the amount of crop being processed by the combine at a given time. Generally, throughput can be computed by measuring yield over a time period. For example, if the yield sensor detects that grain tank 28 holds 10 bushels at time T, and then detects that grain tank 28 holds 10.1 bushels at time T+6 seconds, the throughput is determined as 1 bushel per minute. In another example, if the yield sensor detects that grain tank 28 holds 10 bushels at time T, and then detects that grain tank 28 holds 10.3 bushels at time T+6 seconds, the throughput is determined as 3 bushel per minute.

Throughput is a factor that may be beneficial to controlling the speed of fan 52 in order to optimize the harvesting efficiency of the combine (e.g. maximize throughput and/or minimize loss). If fan 52 is set at a constant speed during harvesting, problems may occur in the cleaning process (e.g. insufficient cleaning or lost grain). For example, at low throughput, the cleaning fan may inadvertently blow grain out of the cleaning system along with the chaff. This grain is ejected from the combine and lost. In contrast, at high throughput, the cleaning fan may not be blowing strong enough to properly clean the grain. As a result, chaff and other unwanted materials make their way into grain tank 28.

In order to avoid these problems, the present system allows the combine to control the fan automatically based on feedback from the yield monitor and/or loss monitor. Multiple throughput and/or loss thresholds and corresponding fan speeds may be set by the operator or some other entity prior harvesting. These thresholds and corresponding fan speeds may be set based on a number of factors including but not limited to fan specifications, harvester ground speed, thresher speed, type of crop, land features, etc. During harvesting, the controller monitors throughput and/or loss and compares the detected values to the thresholds. The controller then adjusts the fan speed to a level that corresponds to the respective threshold. There may be several points at which the fan would adjust speed. This method results in lower loss while maintaining a high quality sample. The operator and/or a third party (e.g., farm manager) can set the thresholds and corresponding fan speeds based upon one or more conditions. These thresholds and corresponding fan speeds may also be adjusted by the operator during harvesting.

Figure 3:
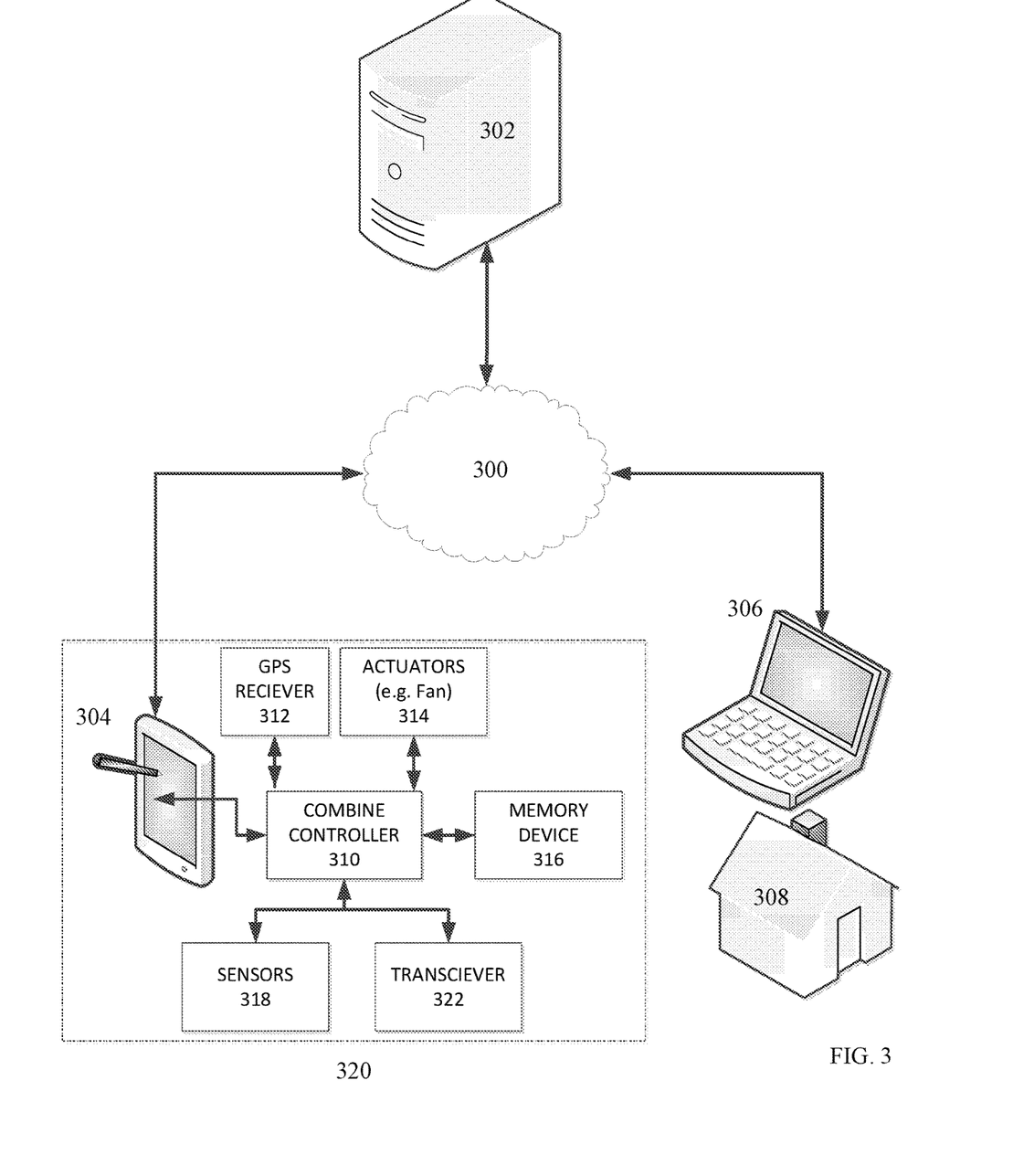
FIG. 3 is a system view of network based communication between the combine controller, a remote personal computer and a server, according to an embodiment of the invention.

FIG. 3 shows an example of a system for controlling the combine. The system includes an interconnection between a control system 320 of combine 10, a remote PC 306 and a remote server 302 through network 300 (e.g. Internet). It should be noted that combine 10 does not have to be connected to other devices through a network. The controller of combine 10 can be a standalone system that receives operating instructions (e.g. throughput/loss thresholds and corresponding fan speeds) through the user interface, or through a removable memory device (e.g. Flash Drive).

Prior to operating combine 10, an operator may designate the throughput/loss thresholds and corresponding cleaning fan speeds. In one example, the operator uses interface 304 of the combine control system or PC 306 located at remote location 308. Interface 304 and PC 306 allows the operator to view locally stored parameters from memory device 316 and/or download parameters from server 302, using transceiver 322 (e.g. WiFi, Bluetooth, Cellular), through network 300. The operator may select (via Interface 304 or via PC 306) appropriate throughput/loss thresholds and corresponding fan speeds based on various factors including the type of crop to be harvested by the combine. Once these thresholds and speeds are selected, the operator begins harvesting. Combine controller 312 then controls actuators 314 (e.g. fan 52) based on the thresholds. For example, sensors 318 (e.g. yield and loss sensors) may be used during harvesting to compare throughput and/or loss to the thresholds in order to control fan 52. Harvesting may also be tracked and aided by GPS receiver 312.

Figure 4A:
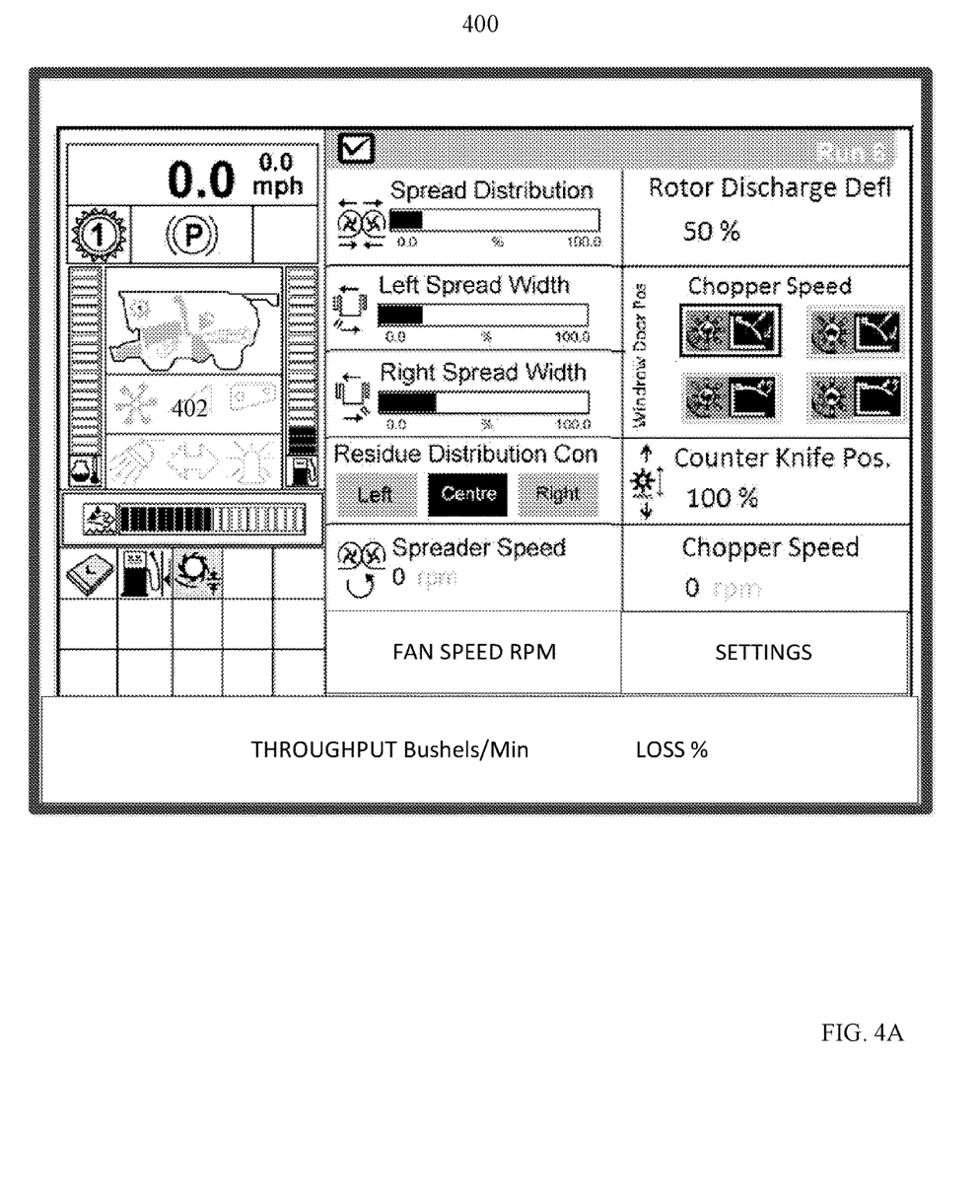
FIG. 4A is an illustration of a user interface for monitoring and controlling the combine fan, according to an embodiment of the invention.

An example of interface 304 is shown in FIG. 4A where various parameters and other harvesting data are displayed to the operator through a graphical user interface (GUI) 400. These parameters may include a graphical view of the map 402 with designated zones, land grade (not shown), current operational mode (spreading/windrow modes), operational parameters/states for the spreader impellers (e.g. ON/OFF), operational parameters/states for the chopper (e.g. rotation speed), operational parameters/states for the counter knives (e.g. engage/disengage), operational parameters/states for the swath selection door (e.g. open/closed), operational parameters/states for the spreader chute position (e.g. horizontal/vertical), etc. Also included is the current cleaning fan speed, throughput and loss. The thresholds and speeds of the fan may be set by choosing the settings button which launches a screen (see FIG. 4B) for viewing and/or adjusting these parameters.

Figure 4B:
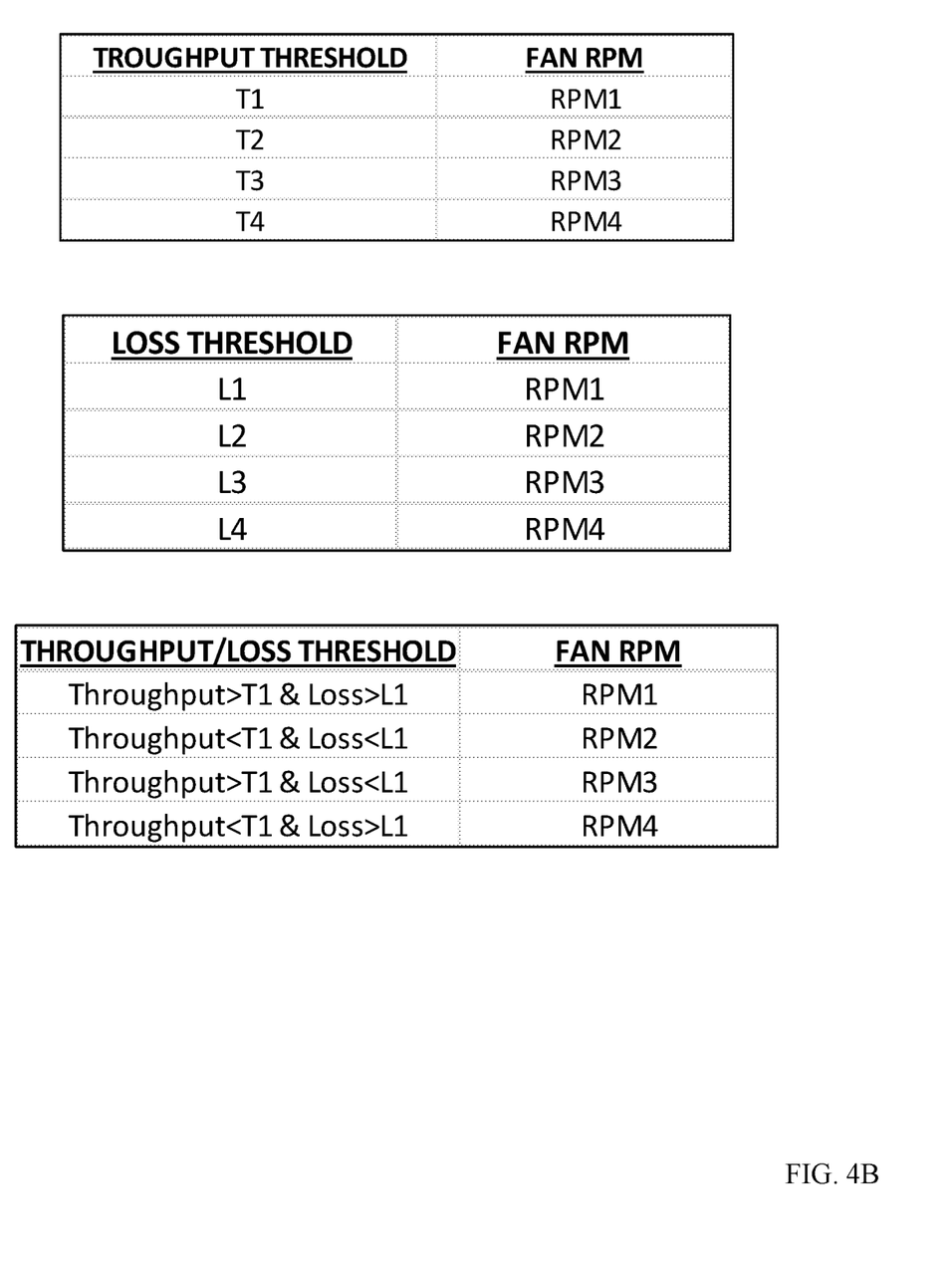
FIG. 4B shows three tables with fan speeds corresponding to throughput and/or loss thresholds, according to an embodiment of the invention.

FIG. 4B. shows examples of three tables for setting the throughput/loss thresholds and fan speeds. As described above, fan speed may be controlled based on throughput and/or loss.

The first table in FIG. 4B shows settings for controlling the fan speed based on throughput. The first table includes four throughput thresholds and four corresponding fan speeds in revolutions per minute (RPM). In one example, the values may be RPM1=500, RPM2=1000, RPM3=1500, and RPM4=2000.

Figure 5A:
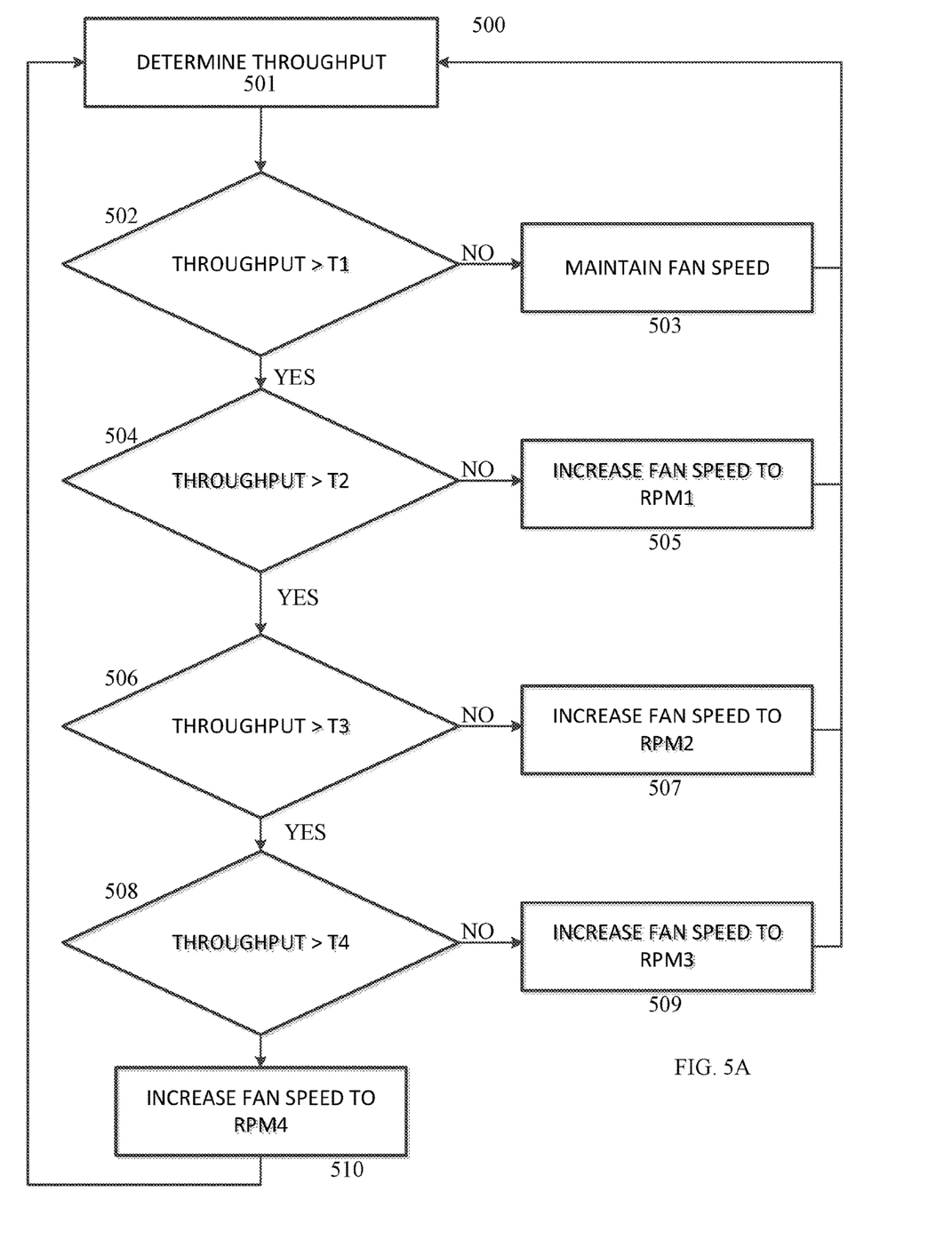
FIG. 5A is a flowchart of steps for automatically operating the cleaning fan based on grain throughput, according to an embodiment of the invention.

Controlling the combine based on the first table is illustrated by the flowchart in FIG. 5A. In step 501, controller 310 computes throughput based on the detected yield. In step 502, controller 310 compares the throughput to threshold T1. If throughput is not greater than T1, then controller 310 maintains the current fan speed in step 503. If throughput is greater than T1, then controller 310 compares the throughput to threshold T2 in step 504. If throughput is not greater than T2, then controller 310 increases the current fan speed in step 505 to RPM1. If throughput is greater than T2, then controller 310 compares the throughput to threshold T3 in step 506. If throughput is not greater than T3, then controller 310 increases the current fan speed in step 507 to RPM2. If throughput is greater than T3, then controller 310 compares the throughput to threshold T4 in step 508. If throughput is not greater than T4, then controller 310 increases the current fan speed in step 509 to RPM3. If throughput is greater than T4, then controller 310 increases the current fan speed in step 510 to RPM4. This process may be periodically repeated to ensure that the fan speed is set according to the current throughput.

The second table in FIG. 4B shows settings for controlling the fan speed based on loss. The second table includes four loss thresholds and four corresponding fan speeds. In one example, the values may be RPM1=2000, RPM2=1500, RPM3=1000, and RPM4=500.

Figure 5B:
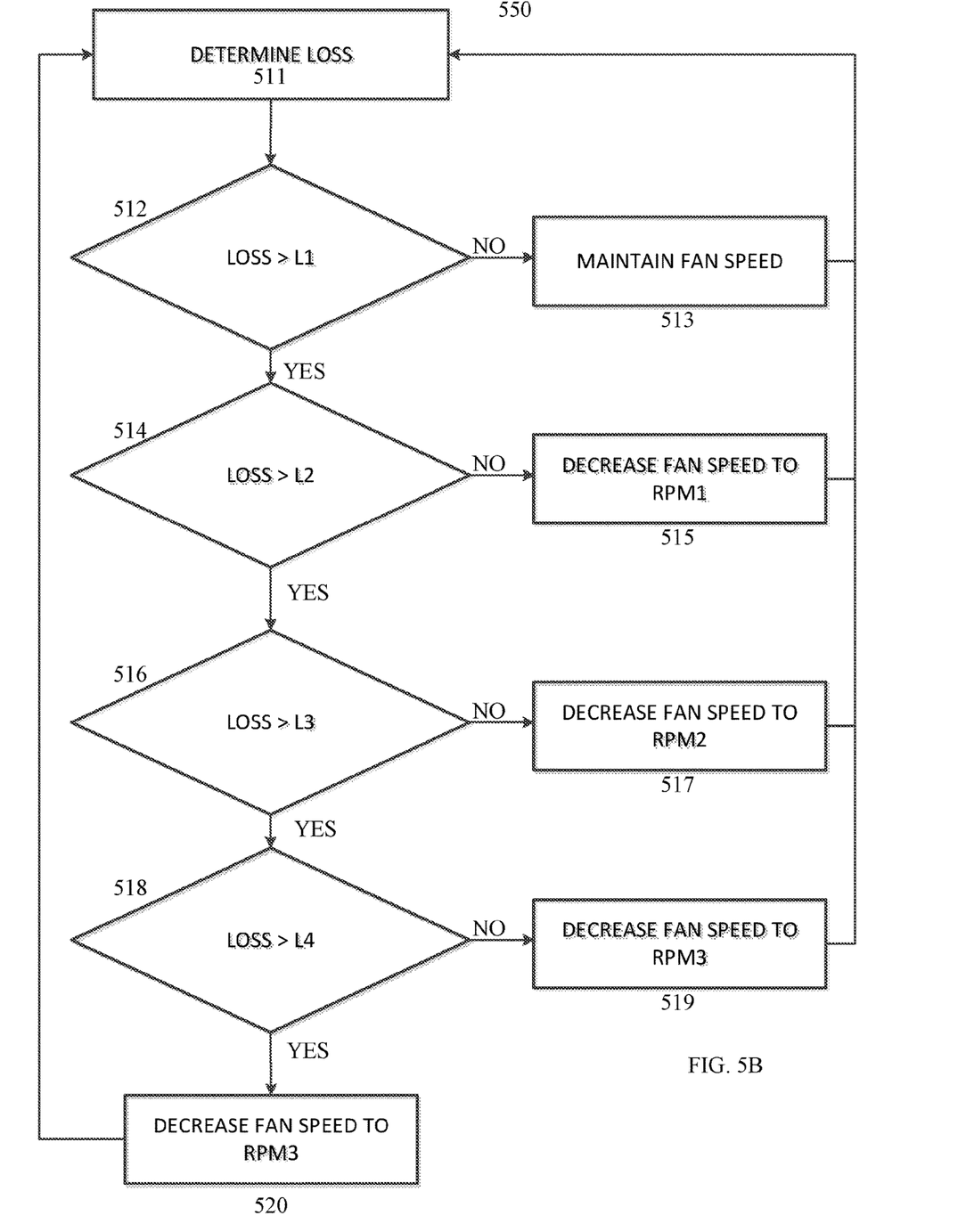
FIG. 5B is a flowchart of steps for automatically operating the cleaning fan based on grain loss, according to an embodiment of the invention.

Controlling the combine based on the second table is illustrated by the flowchart in FIG. 5B. In step 511, controller 310 determines loss. In step 512, controller 310 compares the loss to threshold L1. If loss is not less than L1, then controller 310 maintains the current fan speed in step 513. If loss is less than L1, then controller 310 compares the loss to threshold L2 in step 514. If loss is not less than L2, then controller 310 decreases the current fan speed in step 515 to RPM1. If loss is less than L2, then controller 310 compares the loss to threshold L3 in step 516. If loss is not less than L3, then controller 310 decreases the current fan speed in step 517 to RPM2. If loss is less than L3, then controller 310 compares the loss to threshold L4 in step 518. If loss is not less than L4, then controller 310 decreases the current fan speed in step 519 to RPM3. If loss is less than L4, then controller 310 decreases the current fan speed in step 520 to RPM4. This process is periodically repeated to ensure that the fan speed is set according to the current loss.

The third table in FIG. 4B shows settings for controlling the fan speed based on throughput and loss. The third table includes four combination thresholds and four corresponding fan speeds. The thresholds in the third table are based on both throughput and loss. For example, throughput is detected and compared to throughput thresholds. Similarly, loss is detected and compared to loss thresholds. Each comparison produces a logic 0 or a logic 1 which are then combined by a logical operator (e.g. 'AND'). In this example, both conditions must be met in order to control the fan according to the corresponding fan speed. In one example, the values may be RPM1=1500, RPM2=1000, RPM3=500, and RPM4=2000.

Figure 5C:
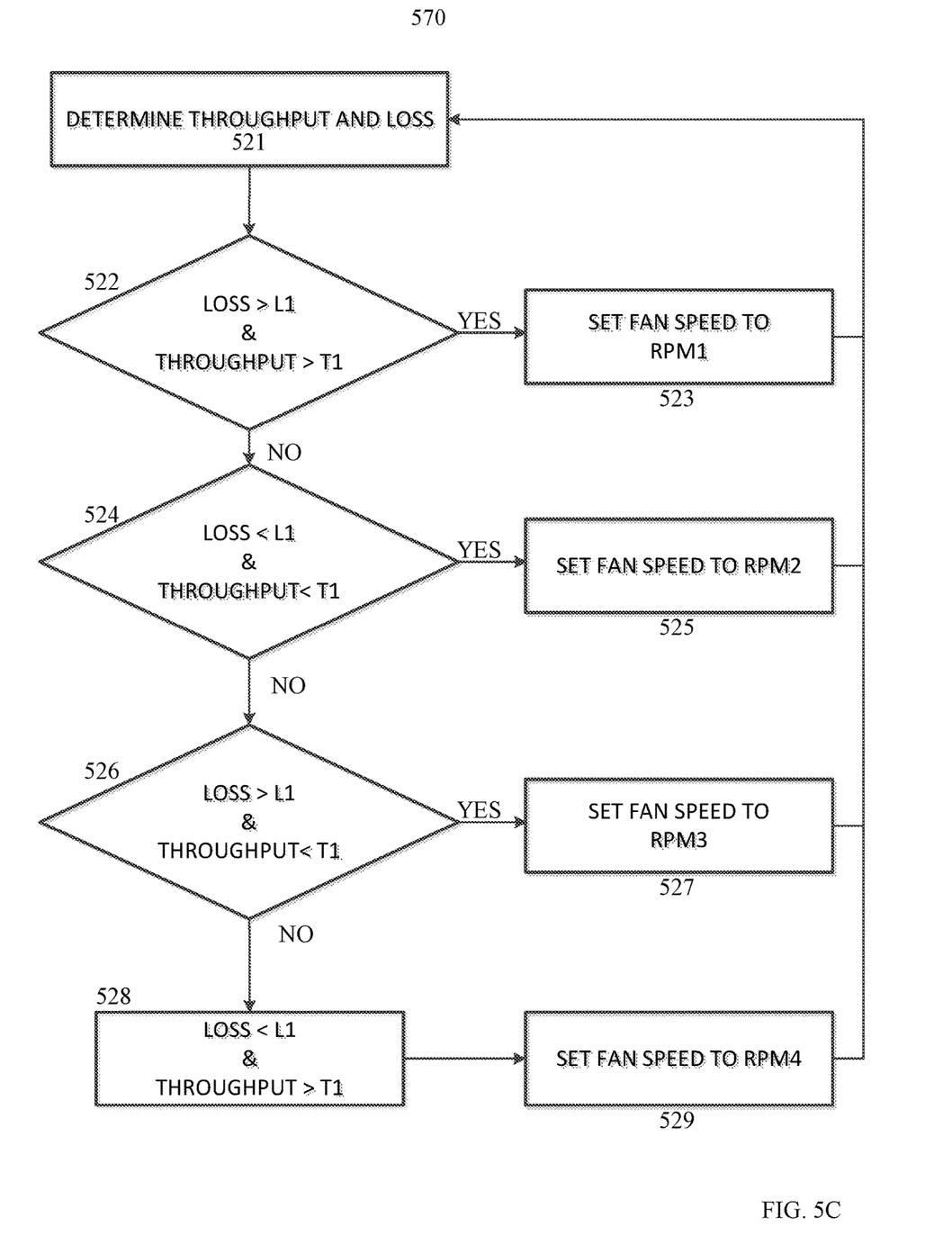
FIG. 5C is a flowchart of steps for automatically operating the cleaning fan based on grain throughput and grain loss, according to an embodiment of the invention.

Controlling the combine based on the third table is illustrated by the flowchart in FIG. 5C. In step 521, controller 310 computes throughput and loss. In step 522, controller 310 compares the throughput to threshold T1 and the loss to threshold L1. If throughput is greater than T1 and loss is greater than L1, then controller 310 sets the fan speed to RPM1 in step 523. If throughput is not greater than T1 or loss is not greater than L1, then controller 310 performs the comparison in step 524. If throughput is less than T1 and loss is less than L1, then controller 310 sets the fan speed to RPM2 in step 525. If throughput is not less than T1 or loss is not less than L1, then controller 310 performs the comparison in step 526. If throughput is less than T1 and loss is greater than L1, then controller 310 sets the fan speed to RPM3 in step 527. If throughput is not less than T1 or loss is not greater than L1, then controller 310 assumes that throughput is greater than T1 and loss is less than L1 in step 528, and sets the fan speed to RPM4 in step 529. This process may be periodically repeated to ensure that the fan speed is set according to the current throughput and loss.

It is noted that although four entries are shown in the tables of FIG. 4B, the number of table entries can be any value between 1 and N, where N is an integer value. It is also noted that when controlling the fan speed on both throughput and loss, different types of logical operators can be used and multiple thresholds could also be used (e.g. multiple loss thresholds and multiple throughput thresholds).

Steps 501-529 shown in FIGS. 5A-5C are performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in FIGS. 5A-5C, are implemented in software code or instructions which are tangibly stored on a tangible computer readable medium. Upon loading and executing such software code or instructions by the controller 310, the controller 310 may perform any of the functionality of the controller 310 described herein, including the steps shown in FIGS. 5A-5C described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A combine comprising:
   a separating system for threshing harvested crop to separate grain from residue;
   at least one of a yield monitor or a loss monitor;
   a crop cleaning system including a cleaning fan; and
   a controller coupled to the at least one of the yield monitor or the loss monitor, the controller configured to:
   determine at least one of a throughput from the yield monitor, or a loss from the loss monitor,
   compare the determined throughput or loss to a respective plurality of predetermined throughput thresholds or a plurality of predetermined loss thresholds,
   determine, based on the comparison, at least one throughput threshold of the plurality of predetermined throughput thresholds or at least one loss threshold of the plurality of predetermined loss thresholds that corresponds to the determined throughput or loss,
   select a predetermined speed associated with the at least one throughput threshold or the at least one loss threshold, and
   control a speed of the cleaning fan to rotate at the predetermined speed.

2. The combine of claim 1, wherein the controller is further configured to:
   compare the determined throughput to the at least one throughput threshold,
   maintain the speed of the cleaning fan when the determined throughput is less than the at least one throughput threshold, and
   increase the speed of the cleaning fan when the determined throughput is greater than the at least one throughput threshold.

3. The combine of claim 1, wherein the controller is further configured to:
   compare the determined loss to the at least one loss threshold,
   maintain or increase the speed of the cleaning fan when the determined loss is less than the at least one loss threshold, and
   decrease the speed of the cleaning fan when the determined loss is greater than the at least one loss threshold.

4. The combine of claim 1, wherein the controller is further configured to:
   compare the determined throughput to the at least one throughput threshold,
   compare the determined loss to the at least one loss threshold, and
   maintain, increase or decrease the speed of the cleaning fan based on at least one of the comparison of the determined throughput to the at least one throughput threshold or the comparison of the determined loss to the at least one loss threshold.

5. The combine of claim 1, further comprising:
   a touch screen display,
   wherein the controller is further configured to:
   display an indicator on the touch screen display that indicates at least one of the determined throughput or loss and the speed of the cleaning fan,
   receive user input through the touch screen display indicating fan speed settings for a given throughput or loss, and
   control the fan speed based on the received input.

6. The combine of claim 1, further comprising:
a receiver configured to receive data from a remote server, wherein the controller is further configured to:
receive user input through the receiver indicating fan speed settings for a given throughput or loss, and control the fan speed based on the received input.

7. The combine of claim 1, wherein the plurality of predetermined throughput thresholds and the plurality of predetermined loss thresholds are set based in part on a type of the crop being harvested.

8. A method for controlling a combine comprising:
controlling, by the controller, a separating system of the combine to thresh harvested crop and separate grain from residue;
controlling, by the controller, a crop cleaning system that includes a cleaning fan; and
controlling, by the controller, the crop cleaning system by:
determining at least one of throughput from a yield monitor or loss from a loss monitor,
comparing the determined throughput or loss to a respective plurality of predetermined throughput thresholds or a plurality of predetermined loss thresholds,
determining, based on the comparison, at least one throughput threshold of the plurality of predetermined throughput thresholds or at least one loss threshold of the plurality of predetermined loss thresholds that corresponds to the determined throughput or loss,
selecting a predetermined speed associated with the at least one throughput threshold or the at least one loss threshold, and
controlling a speed of the cleaning fan to rotate at the predetermined speed.

9. The method of claim 8, further comprising:
comparing, by the controller, the determined throughput to the at least one throughput threshold,
maintaining, by the controller, the speed of the cleaning fan when the determined throughput is less than the at least one throughput threshold, and
increasing, by the controller, the speed of the cleaning fan when the determined throughput is greater than the at least one throughput threshold.

10. The method of claim 8, further comprising:
comparing, by the controller, the determined loss to the at least one loss threshold,
maintaining or increasing, by the controller, the speed of the cleaning fan when the determined loss is less than the at least one loss threshold, and
decreasing, by the controller, the speed of the cleaning fan when the determined loss is greater than the at least one loss threshold.

11. The method of claim 8, further comprising:
comparing, by the controller, the determined throughput to the at least one throughput threshold,
comparing, by the controller, the determined loss to the at least one loss threshold, and
maintaining, increasing or decreasing, by the controller, the speed of the cleaning fan based on at least one of the comparison of the determined throughput to the at least one throughput threshold or the comparison of the determined loss to the at least one loss threshold.

12. The method of claim 8, further comprising:
displaying, by the controller, an indicator on a touch screen display of the combine that indicates at least one of the determined throughput or loss and the speed of the cleaning fan,
receiving, by the controller, user input through the touch screen display indicating fan speed settings for a given throughput or loss, and
controlling, by the controller, the fan speed based on the received input.

13. The method of claim 8, further comprising:
receiving, by the controller, user input through the receiver indicating fan speed settings for a given throughput or loss, and
controlling, by the controller, the fan speed based on the received input.

14. The method of claim 8, further comprising:
setting, by the controller, the plurality of predetermined throughput thresholds and the plurality of predetermined loss thresholds based in part on a type of the crop being harvested.

* * * * *